United States Patent
Hagn

(10) Patent No.: US 7,142,884 B2
(45) Date of Patent: Nov. 28, 2006

(54) COMBINED FRONT-END CIRCUIT FOR WIRELESS TRANSMISSION SYSTEMS

(75) Inventor: Peter Hagn, Finsing (DE)

(73) Assignee: Epcos AG (DE)

( * ) Notice: Subject to any disclaimer, the term of this patent is extended or adjusted under 35 U.S.C. 154(b) by 768 days.

(21) Appl. No.: 10/029,323

(22) Filed: Oct. 25, 2001

(65) Prior Publication Data

US 2002/0090974 A1 Jul. 11, 2002

(30) Foreign Application Priority Data

Oct. 26, 2000 (DE) .............................. 100 53 205

(51) Int. Cl.
*H04M 1/00* (2006.01)

(52) U.S. Cl. ................. 455/552.1; 455/553.1

(58) Field of Classification Search ........... 455/550.1, 455/55.1, 552.1, 553.1
See application file for complete search history.

(56) References Cited

U.S. PATENT DOCUMENTS

| | | | | | |
|---|---|---|---|---|---|
| 6,018,644 | A | * | 1/2000 | Minarik ....................... | 455/82 |
| 6,070,058 | A | * | 5/2000 | Waldroup et al. ............. | 455/69 |
| 6,185,434 | B1 | * | 2/2001 | Hagstrom et al. ........ | 455/552.1 |
| 6,272,327 | B1 | * | 8/2001 | Kurchuk et al. ............ | 455/217 |
| 6,459,885 | B1 | * | 10/2002 | Burgess ....................... | 455/83 |
| 6,587,444 | B1 | * | 7/2003 | Lenzo et al. ................ | 370/330 |

* cited by examiner

*Primary Examiner*—Curtis Kuntz
*Assistant Examiner*—Alexander Jamal
(74) *Attorney, Agent, or Firm*—Schiff Hardin LLP

(57) ABSTRACT

A front-end circuit is provided for a communication terminal device that is designed for a multi-band and/or multi-mode operation. Various embodiments are provided that are suitable for mobile radiotelephone devices of the third generation and, in particular, for transmission systems according to the UMTS standard upon involvement of a multi-band GSM system.

15 Claims, 12 Drawing Sheets

COMBINED FRONT-END CIRCUIT FOR WIRELESS TRANSMISSION SYSTEMS

BACKGROUND OF THE INVENTION

1. Field of the Invention

The invention relates to a combined front-end circuit for a communication terminal device with multi-band and/or multi-mode transmission system.

2. Description of the Related Art

The numerous, existing wireless transmission systems, particularly mobile radiotelephone systems, can differ both with respect to the transmission standard as well as with respect to the frequency bands employed. Different access methods are also employed, for example, CDMA (Code Division Multiple Access), TDMA (Time Division Multiple Access) or FDMA (Frequency Division Multiple Access).

These different access methods can also comprise different duplex methods in order to separate the transmission and reception data and enable a simultaneous transmission and reception mode at the communication terminal device. FDD (Frequency Division Duplex) and TDD (Time Division Duplex) are known as duplex methods. Some standards also use a duplex method with mixed FDD/TDD mode in which different frequency bands are used for the transmission and reception mode, but the transmission and reception signals are additionally separated from one another in time and are arranged in "time slots". Known transmission standards in the USA are, for example, CDMA 800 and CDMA 1900, whose duplex method ensues in a pure FDD mode. The GSM standard with the individual bands GSM 1800, GSM 1900 and EGSM, whose duplex method ensues in mixed FDD/TDD mode, is widespread in Europe. The TDMA 800 and TDMA 1900 standards encountered in the USA likewise comprise a mixed FDD/TDD mode. In addition, the analog AMPS standard, which works with a pure FDD mode, is also widespread in the USA.

Simple mobile radiotelephone devices (cell phones) make use of a single standard and are therefore only suited for unlimited operation in the regions in which an adequate coverage for this standard is established. Multi-band mobile radiotelephone devices that can cover a plurality of frequency bands are suited for better reachability in regions with incomplete network coverage or for increasing capacity in regions with many users. "Dual-band" and "triple-band" cell phones function according to the same access method (for example, GSM), but can transmit and receive in different frequency bands and are therefore equipped for a plurality of standards, for example, simultaneously for GSM 1800 and EGSM or, additionally, for GSM 1900 as well. Corresponding multi-band cell phones exist for the US market, particularly for the CDMA systems at 800 and 1900 MHz.

In known multi-band mobile radiotelephone terminal devices for standards with a mixed FDD/TDD duplex mode, the access onto the common antenna for transmission (Tx) and reception (Rx) is usually realized via an RF switchover. One transmission system thereby respectively utilizes one (frequency) band pair in which the frequencies for transmission and reception are arranged. When a band pair of a system is at an adequately great distance from the other bands (typically about 1 octave), then the filters and the signal processing paths for this band pair, separated from the others, can be interconnected and connected to the common antenna in an impedance-neutral fashion via a diplexer. The band pairs of other standards that lie closer to one another are usually separated from one another via a multiple switch in known multi-band terminal devices.

FIG. 1 shows a front-end circuit of a known triple band GSM system. The circuit is suited for communication terminal devices (for example, cell phones) that can work in three different GSM bands, namely GSM 1800, GSM 1900 and EGSM. In terms of frequency, the transmission and reception band for the EGSM system is clearly separated from the band pairs for the two other GSM systems and is at a distance of above 1 octave. A separation of these two band ranges ensues with a diplexer DI1 (i.e., a passive frequency separating filter) that is composed of a high pass filter HDI1 and of a low pass filter LDI1 that are interconnected in parallel with the antenna A. A switchover US1 that optionally connects the output of the low pass filter LDI1 to the transmission filter SF3 or to the reception filter EF3 of the EGSM system is arranged at the output of the low pass filter. The other output TX3 of the transmission filter, which is fashioned as low pass filter, is connected to a power amplifier (PA) (not shown). Likewise, the other output RX3 of the reception filter EF3 is connected to a low noise amplifier (LNA) (not shown). The EGSM system with mixed FDD/TDD mode work time-offset for transmission and reception in different time slots by which the switchover US1 produces the connection to the corresponding filter and the signal processing path depending on the respective time slot.

The second output of the diplexer DI1 (i.e., the output of the high pass filter HDI1) is connected to a multiple switch MS1 that can switch back and forth between the transmission and reception filters of the two other GSM bands. For transmitting, a common low pass filter is used as a transmission filter SF1,2 for both bands. A respective, discrete band pass filter EF1 and EF2 is available for the reception via the two reception paths Rx1 and Rx2. Depending on the desired band, the multiple switch MS1 for transmission and reception switches back and forth between the two switch points 1 and 2 or 1 and 3.

System-overlapping mobile radiotelephone terminal devices that can use different access methods ("multi-mode devices") have not yet been disclosed. Terminal devices for mobile radiotelephony of the third generation (3 G) that are set to be introduced in the next few years, are likewise not known.

SUMMARY OF THE INVENTION

It is therefore an object of the present invention to provide a combined front end circuit for wireless transmission systems that is designed for different access methods.

This object is inventively achieved with a front-end circuit for a communication terminal device with a multi-band and/or multi-mode transmission system, comprising at least one switch element selected from the group consisting of RF switches, duplexers and diplexers; a common antenna; mixed mode filters for a mixed mode transmission system with a mixed FDD/TDD mode; and pure mode filters for a pure mode transmission system with a pure FDD or pure TDD mode; wherein individual filters of said mixed mode filters and said pure mode filters are connected to said common antenna via a circuit with said at least one switch element. The radiotelephone device may be operated in any combination of a second or third generation system. Advantageous developments are described below.

The invention provides a front-end circuit for a communication terminal device that is designed for a multi-band mode and/or for a multi-mode mode. It comprises RF filters for a transmission system with mixed FDD/TDD mode as well as filters for a transmission system with a pure FDD mode or a pure TDD mode. The individual filters of the front-end circuit are connected to a common antenna, and switch elements that are selected from RF switches, duplexers and diplexers are or can be arranged between the filters and the antenna as well as between the filters and the transmission and reception amplifiers. Due to the employment of a common antenna, the front-end circuit is designed such that switching back and forth between the individual access methods and the different duplex modes can be automatically carried out with frequency separating filters (diplexers or duplexers) or designationally carried out with switches. A plurality of switches and a plurality of frequency separating filters can also be integrated in the inventive front-end circuit.

A "front-end circuit" is understood to be the antenna-side part of a communication terminal device that connects the common antenna to the RF filters and these to the potentially different signal processing paths for the different operating modes and access methods, particularly to the LNA (low noise amplifier) for the input path or to the PA (power amplifier) for the transmission path, and that also comprises the switches required for switching between the access methods and the operating methods.

DESCRIPTION OF THE DRAWINGS

The invention is explained in greater detailed below on the basis of exemplary embodiments and related Figures.

FIG. 1 is a schematic block diagram showing a front-end circuit of a known triple band GSM system;

FIG. 2 is a schematic block diagram showing a circuit for a mixed FDD/TDD system that is combined with a pure TDD system that works in the same band or in a further band that lies close;

FIG. 3 is a schematic block diagram showing a mixed FDD/TDD system that is combined with an FDD system that works in the same band or in a further band that lies close;

FIG. 4 is a schematic block diagram showing the combination of a mixed FDD/TDD system with a pure TDD system working in another band at a greater distance;

FIG. 5 is a schematic block diagram showing a circuit for the same combination as in FIG. 4, in which a duplexer is provided for the pure FDD system;

FIG. 6 is a schematic block diagram showing an excerpt of an inventive front-end circuit that unites a pure FDD system with a pure TDD system neighboring the former in terms of frequency;

FIG. 7 is a schematic block diagram showing a front-end circuit realized with four filters for the same combination as shown in FIG. 6;

FIG. 8 is a schematic block diagram showing a front-end circuit according to FIG. 7 that is combined with a further mixed FDD/TDD system;

FIG. 9 is a schematic block diagram showing a combination of a front-end circuit according to FIG. 6 that is combined with a further mixed FDD/TDD system;

FIG. 10 is a schematic block diagram showing a version of FIG. 9 in which the frequency bands of the mixed FDD/TDD system are farther away from the two pure systems;

FIG. 11 is a schematic block diagram showing a version of a front-end circuit according to FIG. 10 in which two reception filters are realized by a single band-pass filter;

FIG. 12 is a schematic block diagram showing a front-end circuit in which an arrangement of FIG. 8 is combined with two further mixed FDD/TDD systems;

FIG. 13 is a schematic block diagram showing a version of FIG. 12;

FIG. 14 is a schematic block diagram showing a front-end circuit that combines a pure TDD system, a pure FDD system and three mixed systems;

FIG. 15 is a schematic block diagram showing a further front-end circuit that is suited for the same system combination as for FIG. 14 but comprises additional switch elements for power measurement of the transmission amplifier;

FIG. 16 is a schematic block diagram showing a circuit for a system with additional protection elements for protecting the transmission amplifier against reactance due to antenna misterminations that could otherwise lead to stability problems and parasitic oscillations; and FIG. 17 is a schematic block diagram showing the same circuit with another version of protective elements.

DETAILED DESCRIPTION OF THE INVENTION

Figure 1:
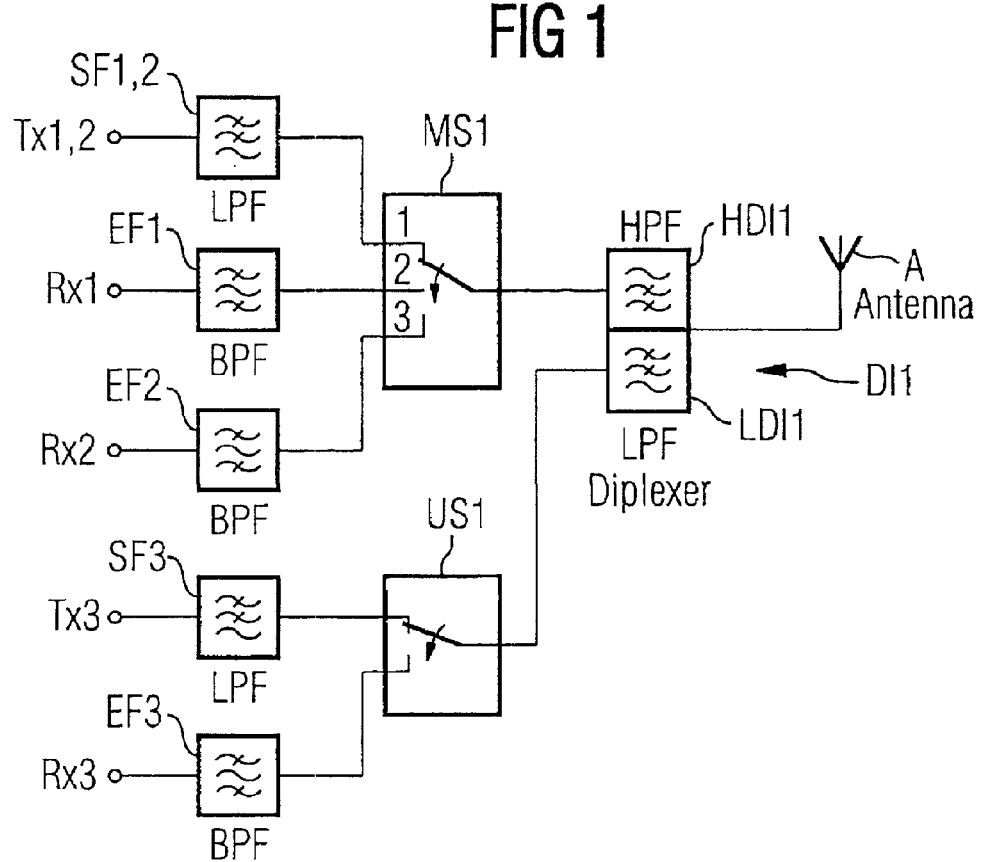
FIG. 1 shows a known front-end circuit.
Figure 2:
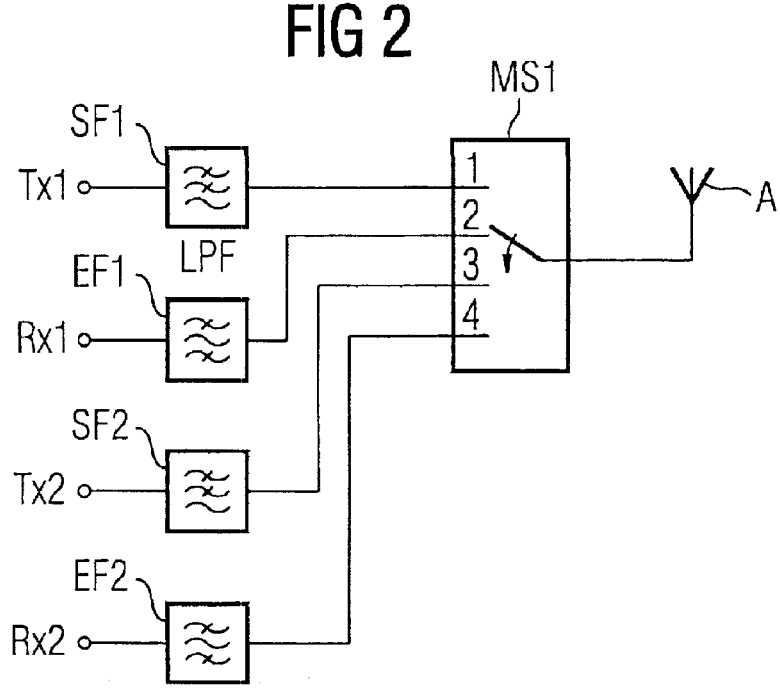
FIGS. 2 through 17 show various inventive front-end circuits either in their entirety or excerpted.

FIG. 2 shows a first exemplary embodiment of an inventive front-end circuit that contains switch elements and filters for a pure TDD system and for a mixed FDD/TDD system that works in the same or in a neighboring band. Since both systems works in time-division multiplex (TDD method), a total of four filters can be connected in alternation to the antenna via a multiple switch MS1. In switch position 1 of the multiple switch MS1, the transmission path Tx1 of the pure TDD system is connected to the antenna via a low pass filter SF1. In switch position 2, the reception path Rx1 of the pure TDD system is connected to the antenna via a band pass filter EF1. The transmission path Tx2 of the mixed FDD/TDD system and the transmission filter SF2 fashioned as a low pass filter is connected to the antenna via the switch position 3, whereas the reception path Rx2 and the reception filter EF2, which is fashioned as band pass filter, is connected to the antenna via the switch position 4.

The two transmission filters are fashioned as low pass filter in order to separate the transmission signal from its unwanted harmonics. A low pass filter also has the advantage that it can work with lower insertion attenuation than is possible for a band pass filter or a duplexer. The reception filters are fashioned as band pass filters that comprise at least the bandwidth required for the corresponding reception band. In general, the insertion attenuation of a band pass filter decreases as the bandwidth becomes narrower. The inventive band pass filters therefore preferably have a bandwidth that is no greater than the required bandwidth of the band to be covered.

The four different filters can be implemented in arbitrary filter technology, and different filter technologies can also be applied within the circuit. For example, the circuit can be realized with SAW filters, MWK filters, FBAR filters, stripline filters, chip LC filters or, with a combination of these filter technologies. All switches that can switch an adjacent radio-frequency signal noise-free and with the speed required for the time slots are suitable as multiple switch MS1.

Figure 3:
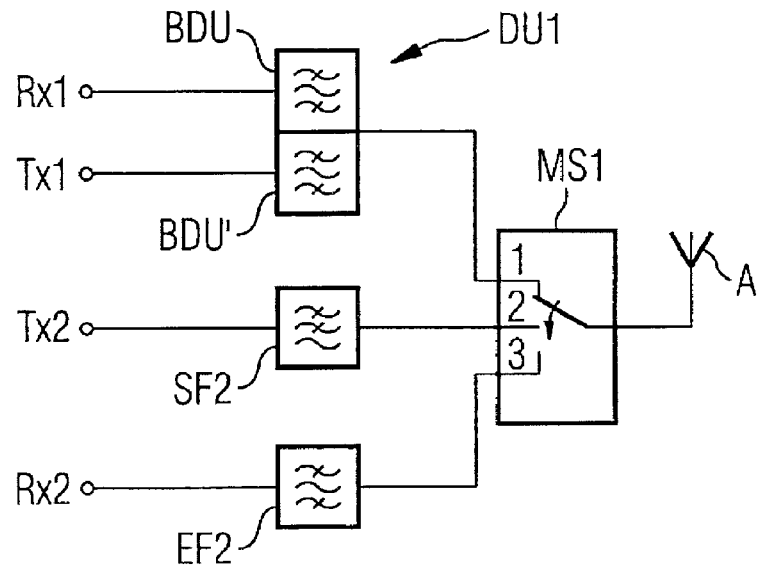

FIG. 3 shows a second exemplary embodiment of an inventive front-end circuit that is suited for the combination of a pure FDD system with a mixed FDD/TDD system that works in the same or neighboring band. The separation of transmission and reception path Rx1 or Tx1 of the pure FDD systems ensues via a duplexer DU1, in which a first band pass filter BDU as a reception filter is passively interconnected with a second band pass filter BDU' as a transmission filter such that the filter in the respectively other band exhibits a high-impedance behavior at the common terminal to the antenna. A multiple switch MS1 that connects the duplexer in switch position 1 but can switch between transmission and reception filter SF2 and EF2 of the mixed FDD/TDD system in the switch positions 2 and 3 is arranged immediately behind the antenna in front of the duplexer DU1. Here, too, the transmission filter SF2 is advantageously fashioned as low pass filter that, due to the low insertion attenuation, allows a stronger transmission signal to pass given the same amplifier power or, given an unchanging signal intensity, enables a lower energy consumption and, thus, a longer transmission duration.

Figure 4:
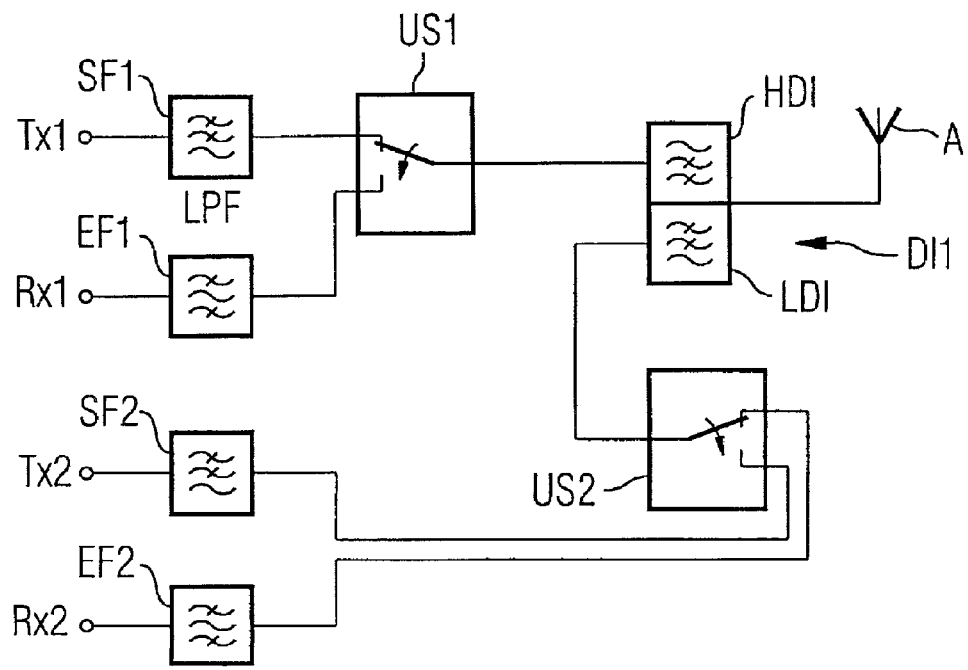

FIG. 4 shows a third exemplary embodiment of an inventive front-end circuit for a combination of a pure TDD system with a mixed FDD/TDD system that works in a different band. Due to the adequate band spacing of the mixed system, the frequency bands are successfully separated with a diplexer DI1 that is arranged behind the antenna. This is composed of a high pass filter HDI and of a low pass filter LDI connected in parallel. The output of the high pass filter HDI is connected to a switch US1 that can switch between the transmission filter SF1 and the reception filter EF1 of the pure TDD system. Here, too, the transmission filter SF1 is again fashioned as low pass filter with low insertion attenuation, whereas the reception filter EF1 is a band pass filter. The other output of the diplexer DI1 (i.e. the output of the low pass filter LDI) is connected to a second switchover US2 that switches back and forth between the transmission band Tx2 or, respectively, the transmission filter SF2 belonging to it that is again fashioned as low pass filter and the reception filter, which is fashioned as band pass filter.

Figure 5:
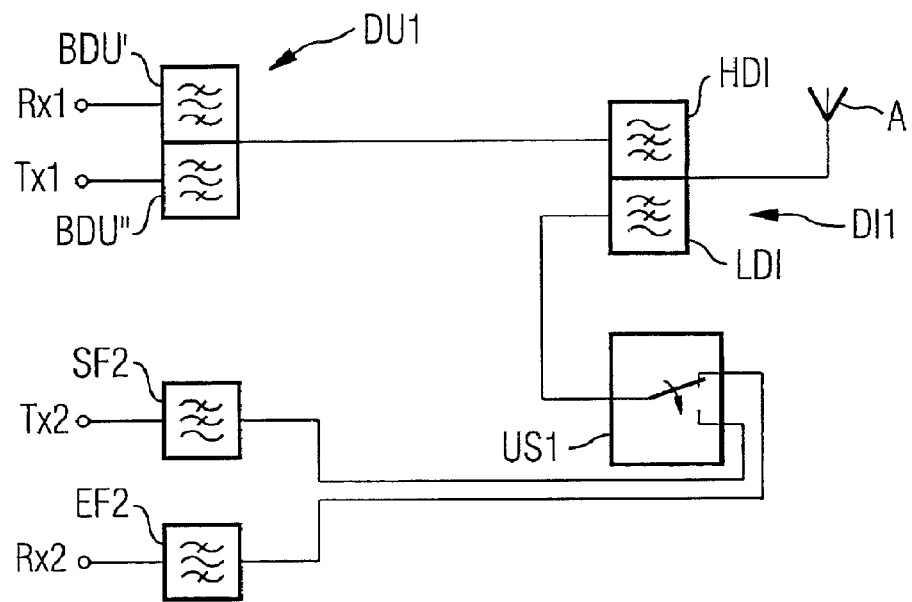

As fourth exemplary embodiment, FIG. 5 shows an inventive, simple front-end circuit that combines a pure FDD system with a mixed FDD/TDD system lying in a different band. Due to the spacing of the mixed system from the pure system, a diplexer DI1 arranged behind the antenna can again also separate the two systems from one another. The high pass filter HDI of the diplexer DI1 is connected to the pure FDD system, and the output of the low pass filter LDI of the diplexer DI1 is connected to the mixed FDD/TDD system, in which a switchover US2 arranged between them switches back and forth between transmission path Tx2 and reception path Rx2.

The exact interconnection of the two systems to the outputs of the diplexer DI1 takes place depending on the frequency position of the two systems, i.e., can also take place conversely given other systems, so that, for example, the pure FDD system is connected to the low pass filter of the diplexer and the mixed system is connected to the high pass filter of the diplexer. In general, the use of a diplexer for the prior selection of different systems is always suited when the frequency spacing between the bands of the systems amount to approximately 1 octave. A frequency spacing of one octave denotes a doubling of the frequency. For example, a system in the 1 GHz band and a system in the 2 GHz band are at a distance of 1 octave from one another. The 1 GHz range, however, is defined here to describe all frequency bands that are arranged between 800 and 1000 MHz, whereas a 2 GHz system covers all the bands that are resident between 1700 and 2200 MHz.

The pure FDD system can transmit and receive simultaneously, where the two signals are then arranged in different frequency bands, the Rx band and the Tx band. A duplexer DUI composed of two band pass filters that are high-impedance in the respectively other frequency band is required for the duplex mode for this system.

Figure 6:
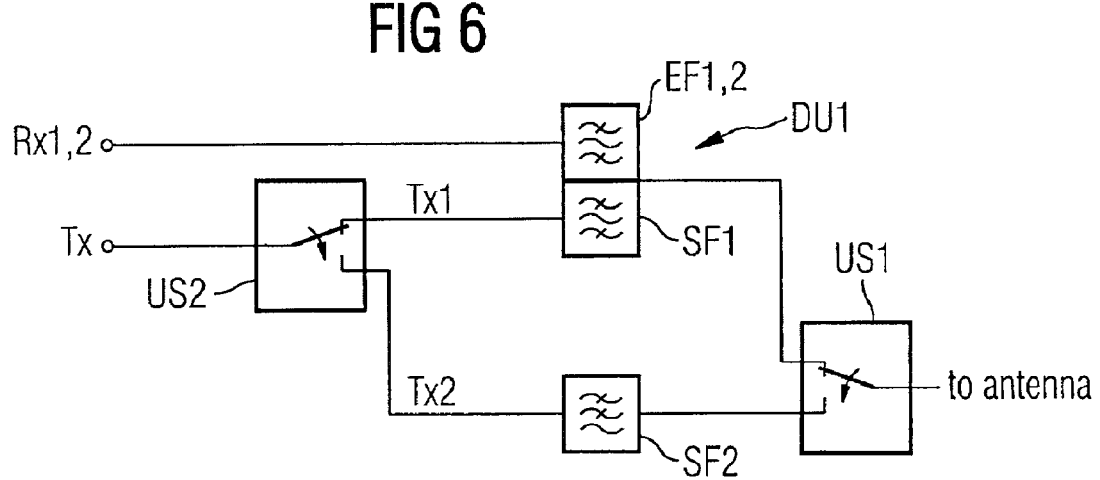

FIG. 6 provides another inventive embodiment for a front-end circuit that combines a pure FDD system and a pure TDD system independently of other integrated systems. A duplexer DU1 is provided for the FDD system in order to separate transmission band Tx1 and reception band Rx1 from one another. According to this exemplary embodiment, the pure TDD system working in an adjacent frequency band can likewise use the reception filter EF1,2 of the duplexer DU1. Depending on the position of the band, it can be necessary to equip the band pass filter EF1, 2 with a correspondingly enlarged bandwidth in order to cover the entire bandwidth of the two reception band in total. The transmission mode of the pure TDD system ensues via a low-loss low pass filter SF2. A first switchover US1 connects the antenna to the duplexer DU1 or to the transmission filter SF2 of the TDD system. A second switchover US2 between the common transmission path Tx and the respective transmission filters SF1 and SF2 serves for switching between the FDD transmission mode via the duplexer and the TDD transmission mode via the low pass filter SF2. A communication connection according to one of the current 2G standards (a mobile radiotelephone of the second generation) can only use one of the two systems. A communication connection according to the future 3G standard can optionally use one or both pure systems (FDD or TDD) for a call for a single communication connection.

Figure 7:
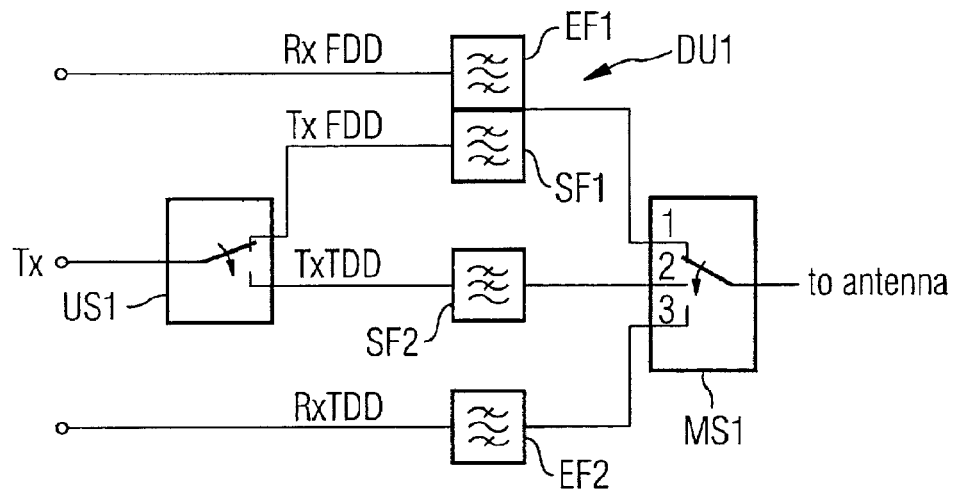

As a further exemplary embodiment, FIG. 7 indicates a solution for a front-end circuit that is designed for two pure systems—a pure FDD system and a pure TDD system—that work in bands adequately separated from one another. The good frequency separation between the bands makes it possible to provide a separate low pass filter SF2 and a separate band pass filter EF2 for the pure TDD system. At the antenna side, switching can be carried out between the transmission mode and the reception mode of the TDD system with the assistance of a multiple switchover MS1. A third switch position 1 of the multiple switchover MS1 connects the antenna to a duplexer DU1 for the pure FDD system that is again realized by impedance-neutral interconnection of two band pass filters. The transmission paths for the two systems can be separated. However, it is also possible—as shown in the exemplary embodiment and in FIG. 7—to provide a common transmission path Tx that is connected as needed with the switchover US1 to the transmission filter SF1 of the pure FDD system or to the transmission filter SF2 of the pure TDD system. The multiple switchover MS1 remains fixed in position 1 given the pure FDD mode, whereas it must switch between positions 2 and 3 for transmission and reception given the pure TDD mode. This embodiment is suited both for a combination or pure transmission systems that use frequency bands lying far apart as well as for system combinations that work in closely adjacent frequency bands.

Figure 8:
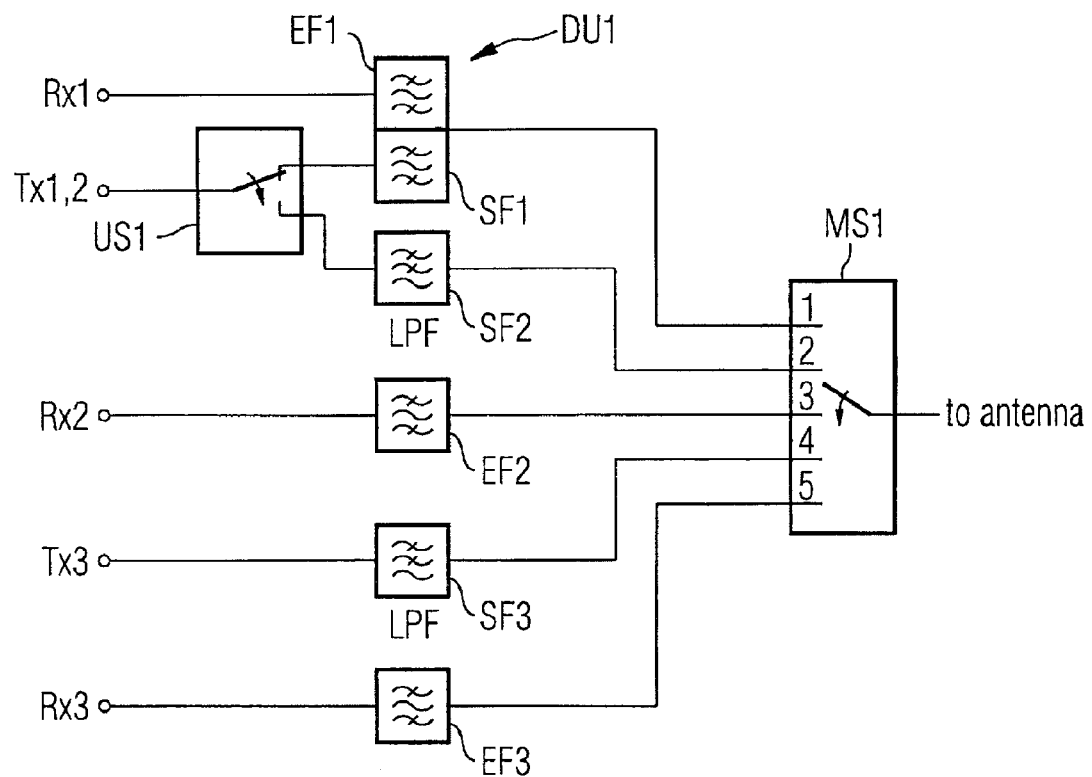

As a further exemplary embodiment, FIG. 8 shows a front-end circuit in which the circuit shown in FIG. 7 is expanded by the corresponding filters and signal processing paths for a mixed FDD/TDD system. A respective separate low pass filter as transmission filter SF3 and a band pass filter EF3 as a reception filter is provided for this mixed system. At the antenna side, switching back and forth between transmission and reception mode of the mixed system is carried out with the assistance of a multiple switchover MS1 via the switch positions 4 and 5. The switch position 1 of the multiple switch MS1 connects the antenna to the duplexer DU1 for the pure FDD system, and the switch positions 2 and 3 of the multiple switchover MS1 connect the antenna to transmission filter SF2 or, respectively, to reception filter EF2 of the pure TDD system. Here, too, a common transmission path Tx can be provided for the two pure systems, this, upon transition onto the respective other system, being connected with the switchover US1 to respectively one of the two transmission filters SF1 and SF2. The illustrated front-end circuit is suited for all system combinations that operate in frequency bands separated from one another. Except for the band pass filter used in the duplexer DU1 as a transmission filter SF1, all transmission filters SF2 and SF3 are fashioned as low-loss low pass filters. All reception filters are fashioned as band pass filters with the bandwidth corresponding to the respective standard.

Figure 9:
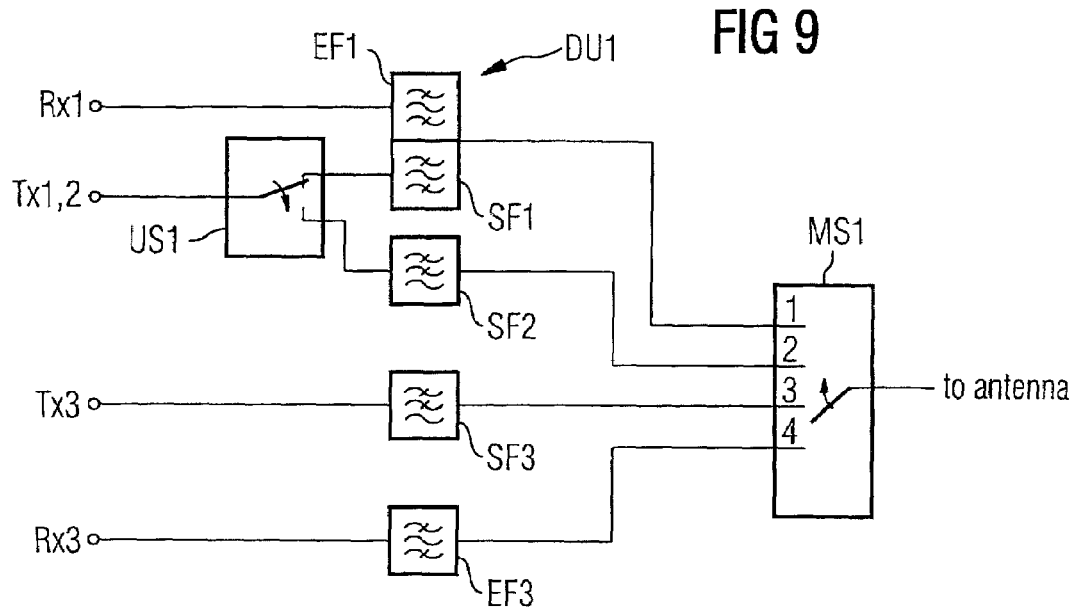

The exemplary embodiment according to FIG. 9 corresponds to the front-end circuit from FIG. 6 that is expanded by a mixed FDD/TDD system. To that end, the multiple switchover MS1 for the mixed system is expanded by the switch positions 3 and 4 that are connected to transmission filter SF3 or, respectively, reception filter EF3. The switchover US1 can optionally connect the common transmission path of the two pure systems to the transmission filter SF1 of the duplexer DU1 of the pure FDD system or to the transmission filter SF2 of the pure TDD system. However, it is also possible to provide separate transmission paths or signal processing paths for the respective transmission signal of the two systems.

In this embodiment, too, the reception filter EF1 of the duplexer must be expanded by the frequency range of the pure TDD reception band. Alternatively, the Tx path of the FDD duplexer can also be expanded by the transmission range of the transmission path of the pure TDD system. A further switchover that switches the received signal onto the Rx path or the reception filter of the duplexer DU1 would then have to be provided between multiple switch MS1 and duplexer DU1 for the reception mode of the pure TDD system.

Figure 10:
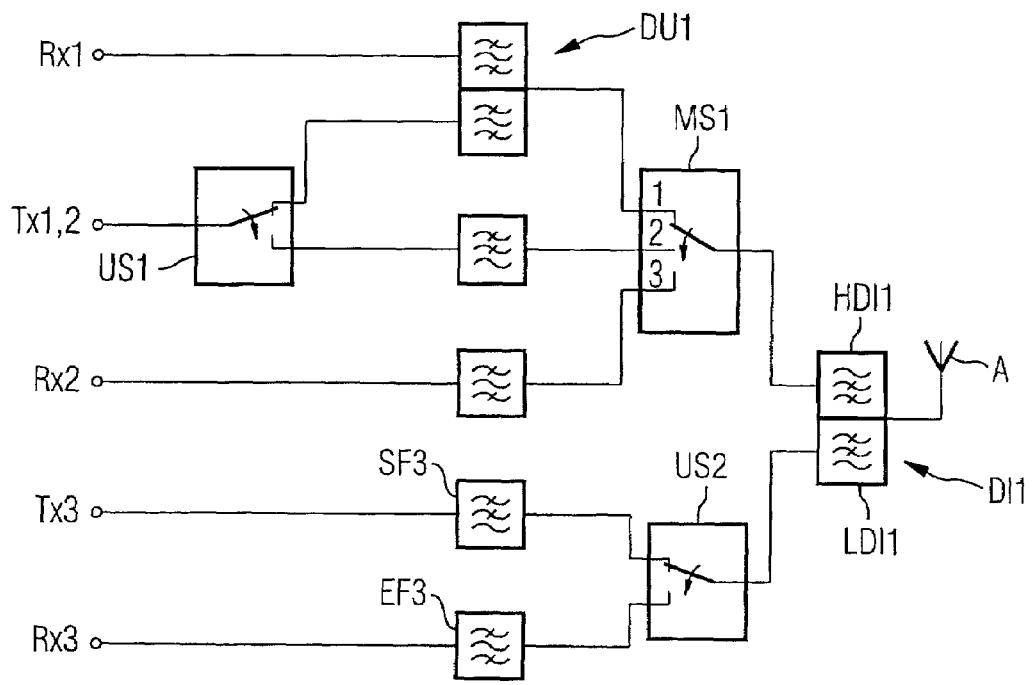

FIG. 10 shows an exemplary embodiment of a front-end circuit in which the exemplary embodiment presented in FIG. 7 is expanded by a mixed FDD/TDD system spaced from it in frequency. The separation of this mixed systems ensues at the antenna side via a diplexer DI1 that is connected via a high pass filter HDI1 to the multiple switch MS1 known from FIG. 7. The low pass filter LDI1 of the diplexer DI1 is connected to a further switchover US2 that switches between the transmission and reception filters and paths for the mixed FDD/TDD system. A low-loss low pass filter is also advantageously provided here for the transmission filter SF3 of the mixed system, whereas a band pass filter is utilized for the reception filter EF3.

Figure 11:
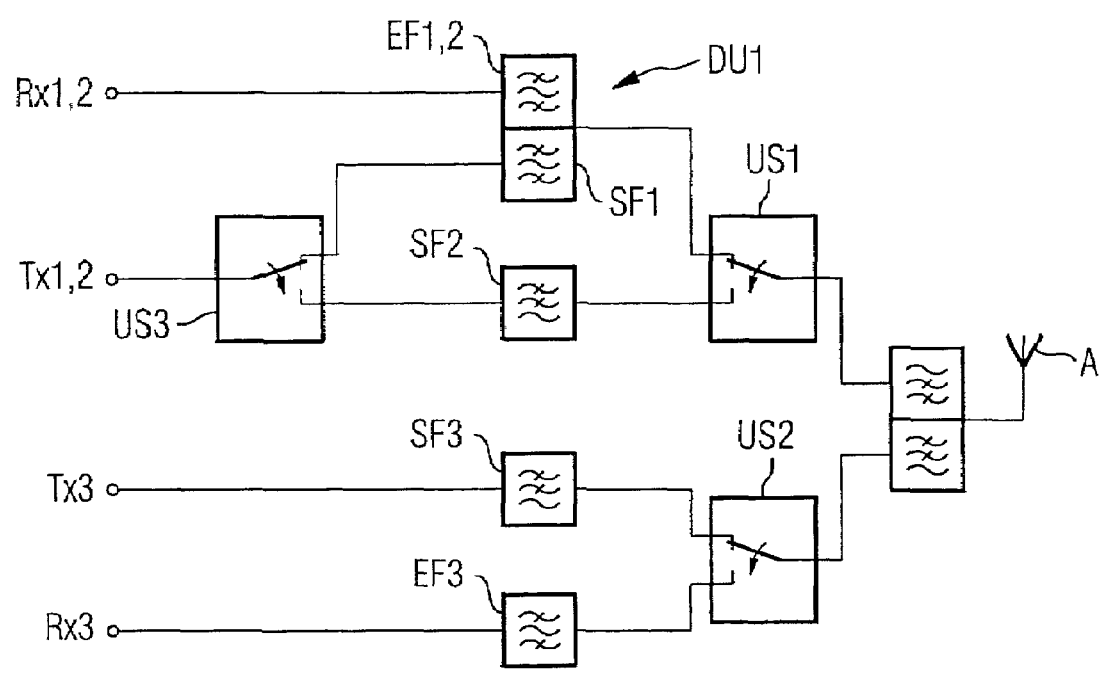

Advantageously, the diplexer DI1 can be fashioned as a surface acoustic wave filter that passively undertakes a pre-selection of the two frequency ranges. As a modification for the exemplary embodiment according to FIG. 10, the separate Rx path of the pure TDD system can be omitted and the Rx path of the pure FDD system and the reception filter EF1, 2 connected to it can be employed instead. FIG. 11 shows this embodiment that is possible for system combinations in which the reception bands Rx of the pure FDD and TDD systems are the same or neighboring. Correspondingly, the reception filter EF1, 2 can be provided with a correspondingly increased bandwidth. A switch (not shown in the Figure) that applies the reception signal onto the antenna-side input of the reception filter EF1, 2 at the duplexer DU1 may then be provided between the switchover US1 and the duplexer DU1 in the reception mode of the pure TDD system.

Figure 12:
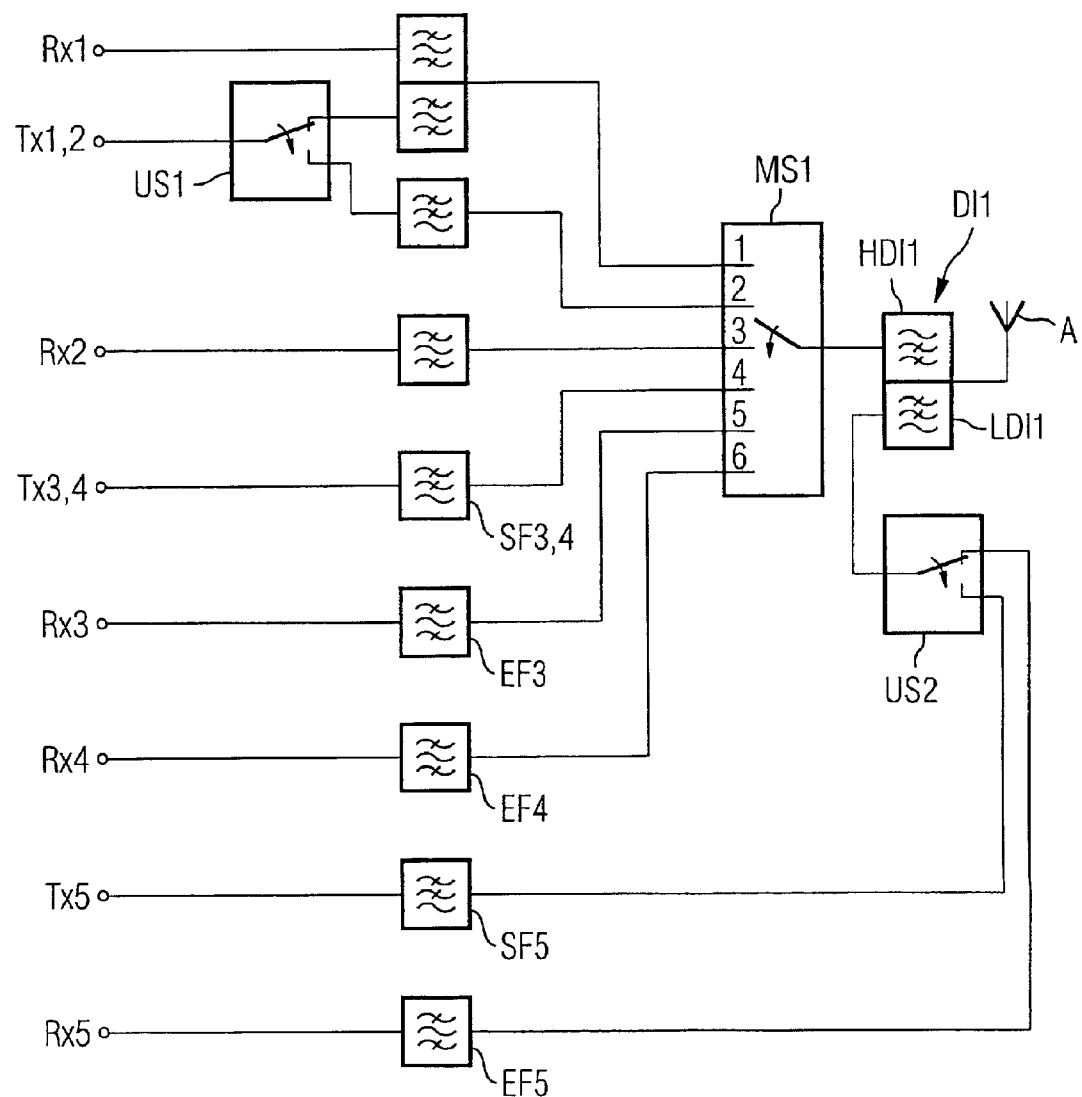

FIG. 12 shows an even more integrated front-end circuit that expands three mixed FDD/TDD systems, for example, a known front-end circuit for a triple-band cell phone, by the corresponding switch elements for a combination with another pure TDD system and a pure FDD system. To that end, for example, the front-end circuit shown in FIG. 10 can be expanded by three further filters SF3, 4, EF3 and EF4 together with the appertaining transmission and reception paths that can be connected to the duplexer DI1 or, respectively, the high pass filter HDI1 thereof at the multiple switch MS1 via the switch positions 4, 5 and 6. Alternatively, it is also possible to connect the three additional filters for a total of two mixed systems via additional switch positions at the switchover US2 that is already connected to the antenna A via the low pass filter LDI1 of the diplexer DI1. A common transmission filter SF3,4 that connects a common transmission path Tx3,4 to the diplexer DI1 and the antenna can be provided for the two additional mixed FDD/TDD systems. The reception paths for the additional two mixed FDD/TDD systems are connected to the multiple switch MS1 via separate reception filters EF3, EF4, and the multiple switch MS1 is in turn connected to the diplexer and to the antenna A. As in the exemplary embodiment according to FIG. 10, the low pass filter LDI1 of the diplexer DI1 is connected to a switchover US2 that switches back and forth between transmission and reception mode of the first mixed FDD/TDD system. This case can also only be applied when at least one of the mixed FDD/TDD systems is separated from the others in terms of frequency, so that they can be passively pre-selected via the diplexer DI1. At least one of the band pairs of a mixed FDD/TDD systems lies closer in frequency to the bands of the pure FDD and TDD systems, which is why the separation via switches is preferred here.

Figure 13:
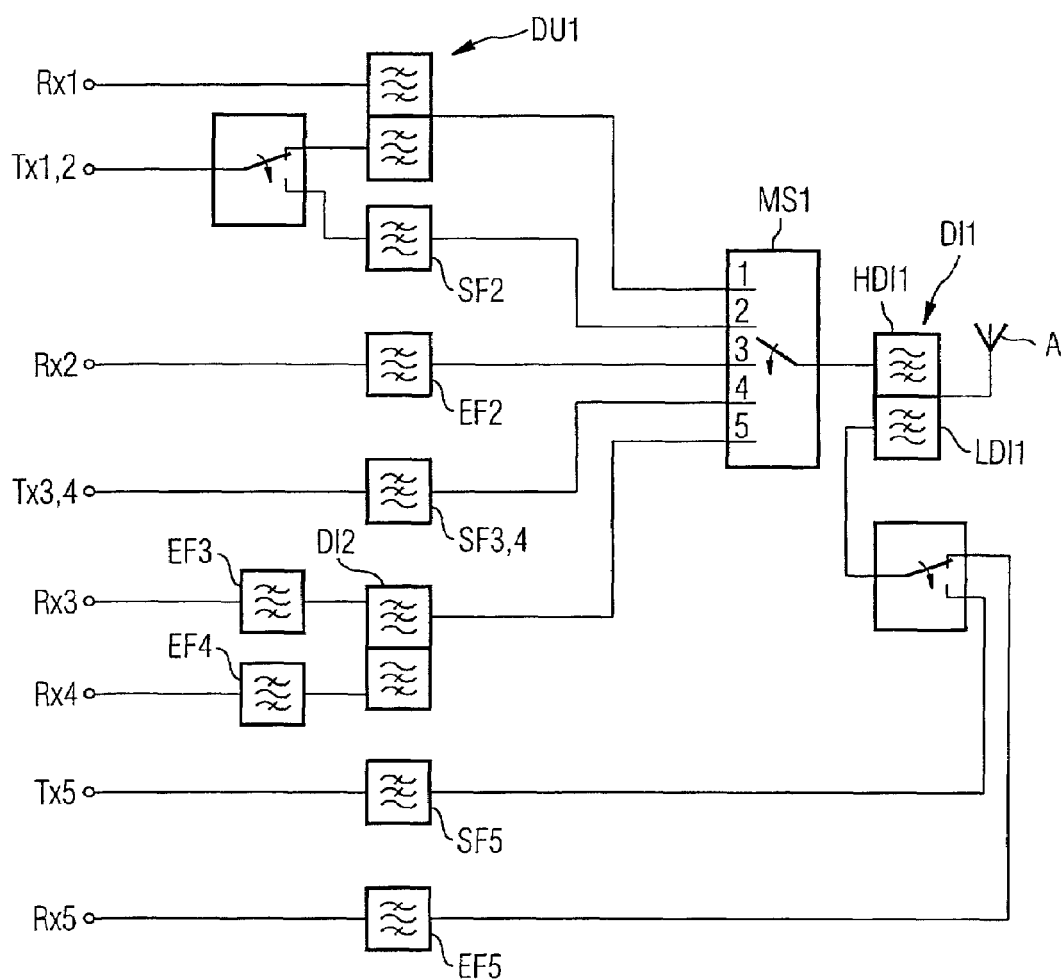

FIG. 13 shows an alternative embodiment in which the two switch positions 5 and 6 (of the multiple switch MS1 from FIG. 12) are combined and an impedance-neutral interconnection with a diplexer DI2 is instead arranged between the two reception filters EF3 and EF4. Only one terminal is therefore required at the multiple switch MS1, this connecting this diplexer DI2 to the antenna-side diplexer DI1 or its high pass filter HDI1.

The exemplary embodiments according to FIGS. 12 and 13 correspond, for example, to a GSM triple-band front-end circuit that is expanded by the functionality of a UMTS front-end circuit (3G mobile radiotelephone). Both the FDD mode for the UMTS standard (Tx band from 1920 through 1980 MHz, Rx band from 2110 through 2170 MHz) as well as the TDD mode of the UMTS standard (frequency bands from 1900 through 1920 MHz and 2010 through 2025 MHz) can thereby be serviced, where no spread of the pass bands of the duplexer BU1 is required for the pure FDD system. The reception filter EF2 of the pure TDD system can be fashioned either as a filter that is 125 MHz broad for covering the two TDD frequency bands or can be realized as a 2-in-1 filter connected at both sides with a double band-pass behavior. A suitable filter technology may be utilized for each of the two alternatives or, respectively, the two filters can be realized in a suitable filter technology.

Figure 14:
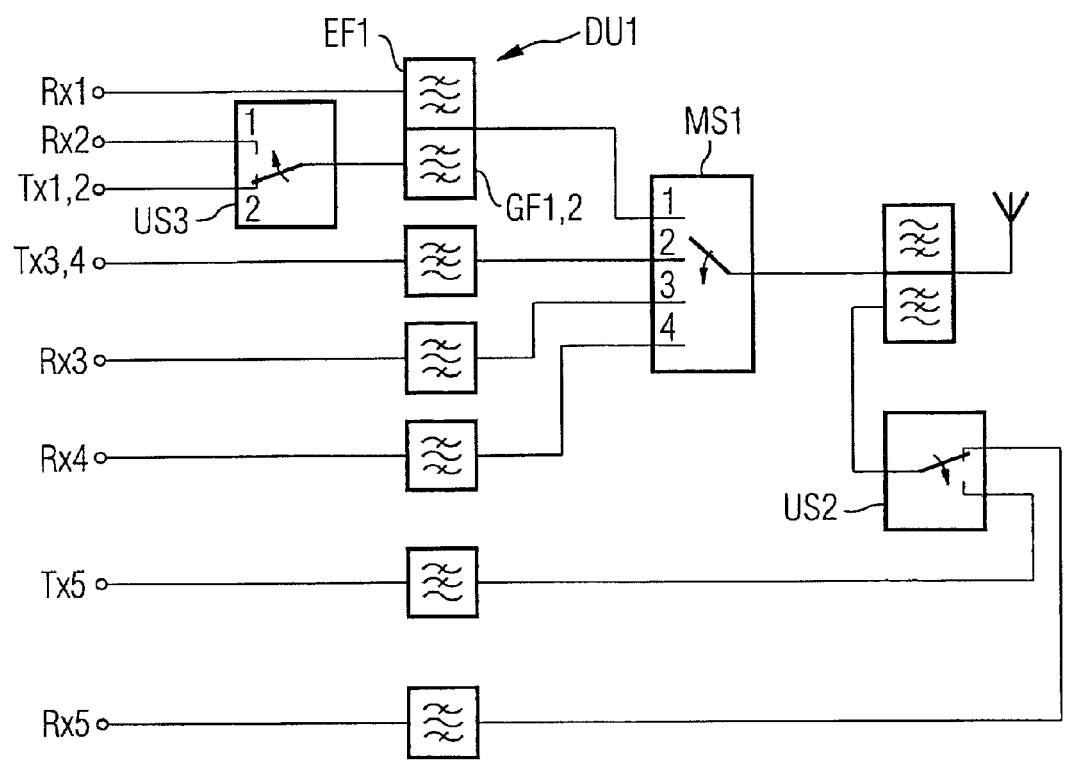

FIG. 14 shows a further variation of the exemplary embodiment shown in FIG. 12 for an inventive front-end circuit. The separate transmission filter SF2 of the pure TDD system is foregone, as is the switch position 2 of the multiple switchover MS1 (see FIG. 12). The two pure FDD and TDD systems share the duplexer DU1 for transmission and reception. One output of the duplexer DU1 is connected to the reception band Rx1 of the pure FDD system, and the second output of the duplexer DU1 is connected via a further switchover US3 to the common transmission path Tx1,2 for the FDD and the TDD system in the first switch position and is connected to the reception path of the TDD system in the other switch position.

For this embodiment, the filter GF1,2 used in common or, respectively, mixed, is designed as a spread filter that is 125 MHz broad and that covers the two frequency bands of the pure TDD system according to the UMTS standard and the Tx band of the pure FDD system according to the UMTS standard. This is always advantageous when such a broad filter represents no deterioration in properties with respect to the insertion attenuation or when such a broad filter can be realized with little insertion attenuation. The multiple switchover MS1 is at position 1 both for the pure FDD mode as well as the pure TDD mode. The switching between transmission and reception mode of the pure TDD system ensues at the switchover US3. For the pure FDD mode, this is fixed in switch position 2. The switch elements and filters for the three mixed FDD/TDD systems in the exemplary embodiment of FIG. 14 are realized as in FIG. 12.

In another modification of the invention, the highly integrated front-end circuits shown in FIGS. 12, 13 and 14 can be simplified by omitting corresponding switches and filters for one or two mixed FDD/TDD systems.

Figure 15:
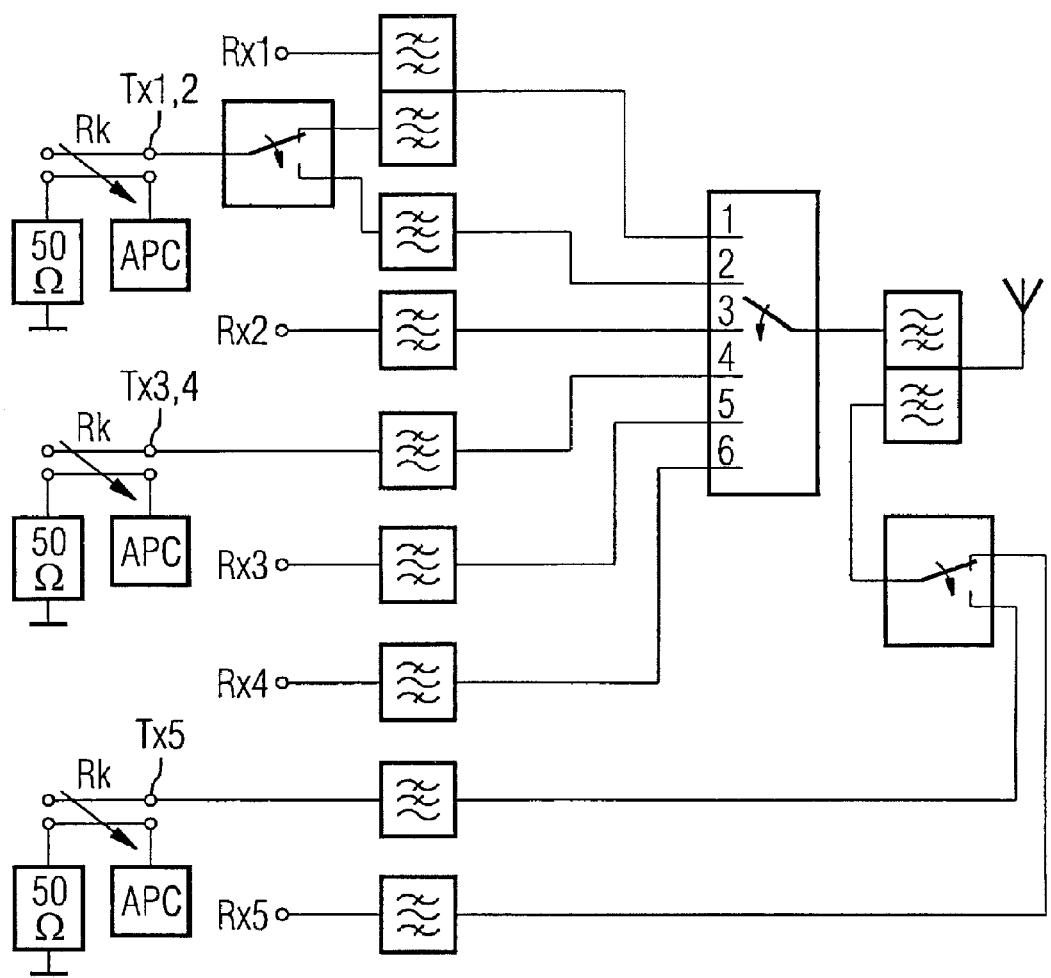

FIG. 15 shows a further development of the invention in which devices for regulating the power of the power amplifier are arranged in the transmission path between the power amplifier of the transmission path and the appertaining filters. Since the communication terminal devices are usually mobile, they must also be designed for locations that exhibit a diminished transmission/reception quality due to geographical conditions. The power of the base station usually suffices to be received everywhere within the appertaining radio cell, but this is rarely true of the transmission power of the mobile terminal device. Moreover, it is desirable to adapt the transmission power of the terminal device to the connection quality in order to correspondingly reduce the transmission power given a good connection quality and to thus save energy or to lengthen the operating duration of the accumulator/battery without previous recharging.

Such a device for readjustment of the power of the transmission amplifier can, for example, be composed of a directional coupler RK that is arranged in a bypass of the transmission path, measures the transmission power, and readjusts this corresponding to the power requested by the base station. Codes that are communicated from the base station to the terminal devices are provided in known mobile radiotelephone systems for the power matching. FIG. 15 shows the arrangement of such directional couplers RK that respectively produce a bypass with a connected power control circuit (APC, Adapted Power Control) and adapts the transmission power according to the demands communicated from the base station. In FIG. 15, these directional couplers are arranged between the transmission paths and the transmission filters of all transmission systems integrated in the circuit. The remaining part of the illustrated front-end circuit corresponds to the circuit of FIG. 12.

Figure 16:
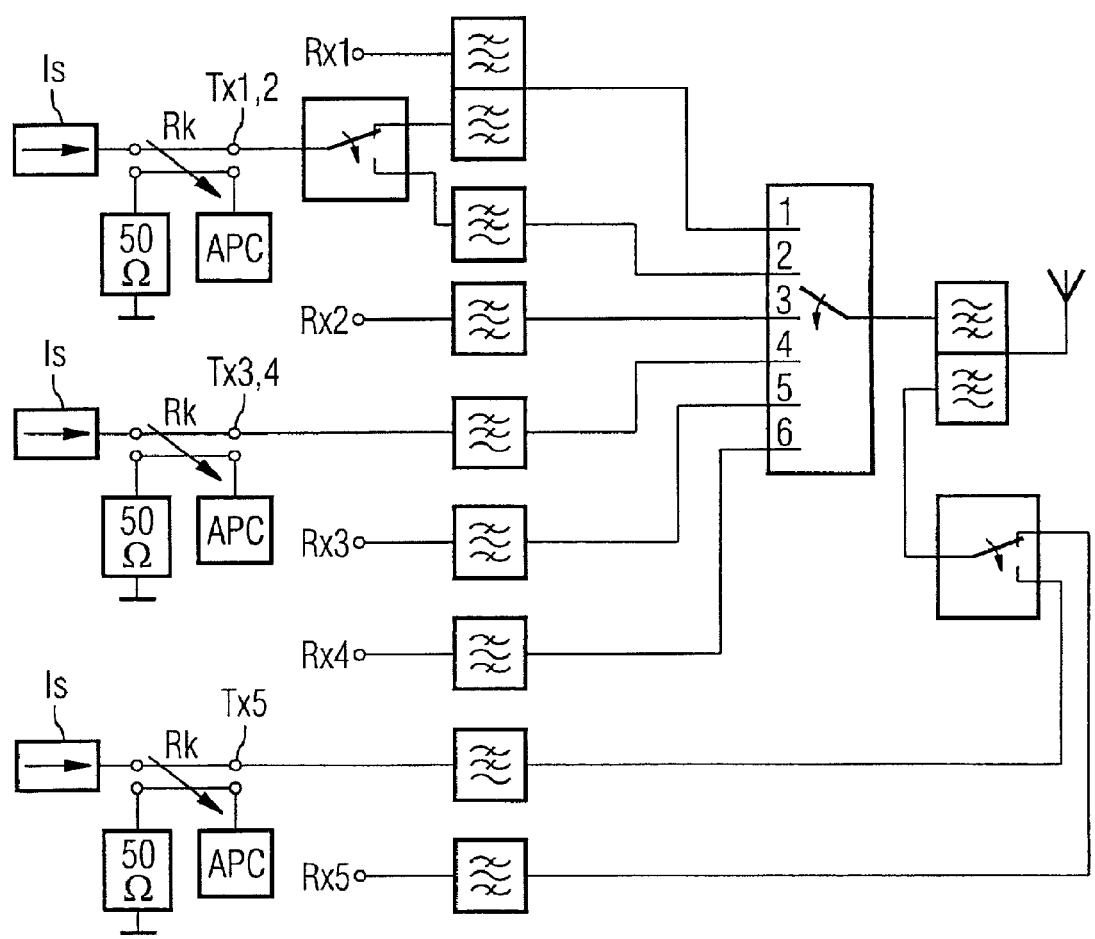
Figure 17:
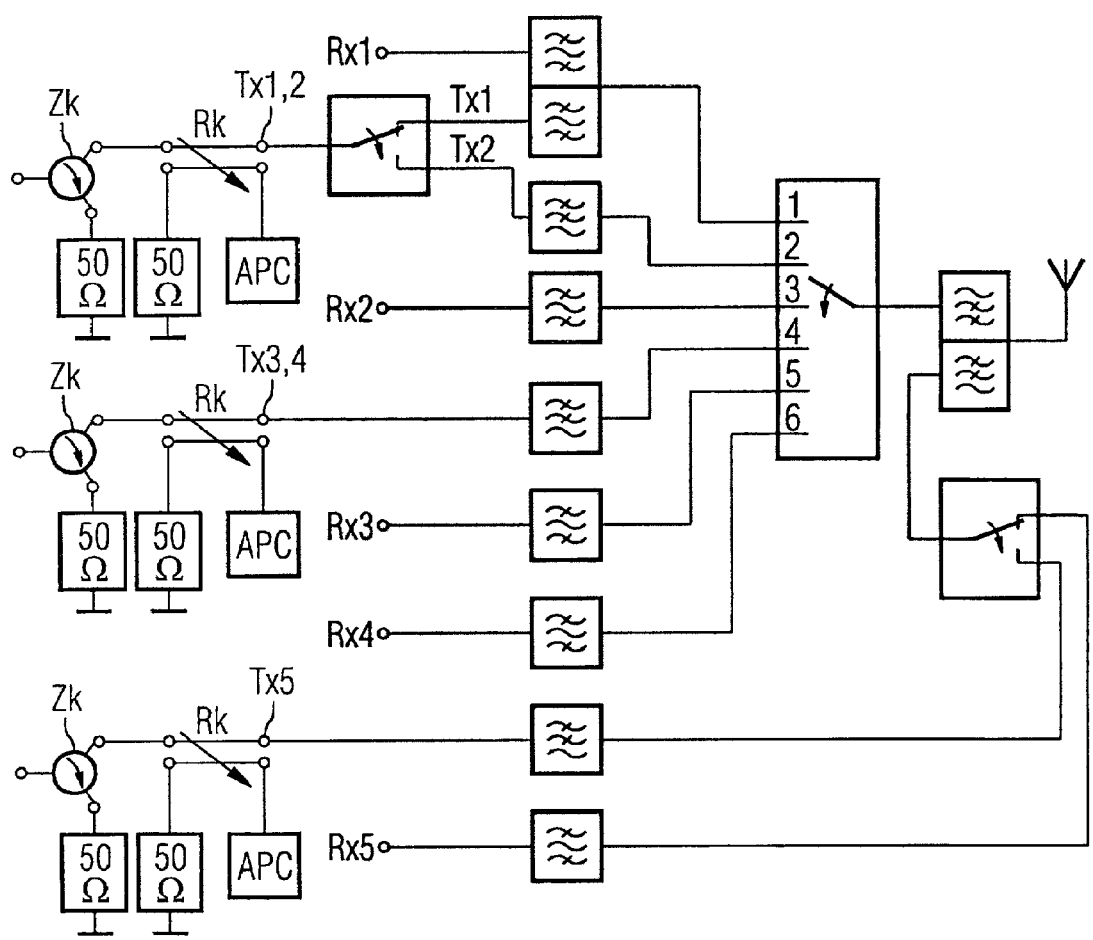

Another development of the invention is indicated in FIG. 16 in which the circuit shown in FIG. 15 is expanded by further protection elements, where a respective protection element is arranged between the power amplifiers of the transmission paths and the inputs of the transmission filters in order to suppress reactances on the transmission filter due to antenna misterminations. Such misterminations can, for example, be unwanted oscillations that can lead to unwanted emissions at wrong frequencies and connection disturbances. These protection elements are fashioned as insulators Is in FIG. 16 and as circulators Zk in FIG. 17. Both are ferromagnetic components: the insulators transmit the RF power only in the arrow direction, whereas the circulators divert the fedback power at a terminating impedance to ground. The front-end circuits of FIGS. 15 and 16 are therefore distinguished by an enhanced protective effect of the transmission units, resulting in an expanded stability region of the communication terminal device.

For the first time, the invention specifies how a front-end circuit can be designed for a 3G communication terminal device that, conforming to the UMTS standard, must govern a multimode operation. The invention also specifies critical simplifications as to how a front-end circuit can be constructed simplified or how the properties of the overall circuit can be improved in view of a better performance by additional components. The individual component parts of the circuit are only executed with their function, so that a number of possible variations exist for the realization of the inventive front-end circuit. Thus, for example, it is possible to partly or entirely integrate to components of the circuit on a common substrate. For example, it is possible to construct some of the filters as ceramic filters (for example, MWK filters, SAW filters, as FBAR filters, as stripline or as chip LC filters) and to embed these on a substrate ceramic, for example, an LTCC multi-layer ceramic (Low Temperature Co-fired Ceramic).

The substrate can also carry the corresponding conductor structures required for the connection of the components; these, for example, can be constructed as planar structures in a multi-layer technique on the substrate. It is also possible to integrate further components on the substrate, for example, the DC drive of the switches. In addition to ceramic substrates, traditional printed circuit boards are also suitable, as is a multi-layer of photostructurable layers. The module character of the front-end circuit, which is entirely or partly integrated on a substrate, is advantageous. A module can be more simply interconnected with other components, whereby a more compact structure, a simpler manipulation and a better interaction with other components are obtained overall compared to an assembly composed of discrete components.

The RF filters, the diplexers, and the duplexers can be constructed in different technologies; different technologies can likewise be utilized for the RF switches, the-multiple switches and the switchovers. For example, the switches can be fashioned as gallium arsenide FET transistors. It is also possible to realize the switches as PIN diodes with additional transformation lines or other matching switch elements that can effect a phase shift. One possible exemplary embodiment here would be a λ/4 stripline that is integrated in the carrier substrate.

Depending on the requirement of the communication terminal device, the outputs of the reception paths can be implemented symmetrical or differential, where the impedance termination as well as the antenna termination can respectively be at 50 Ω or can be raised or lowered relative to the antenna termination with impedance transformation.

A number of other combinations are also conceivable in addition to the realizations of the invention presented in the exemplary embodiments and the appertaining Figures, these being possible by omitting individual components or by combining individual components of the described exemplary embodiments. The above-described front-end circuit and use of this circuit are illustrative of the principles of the present invention. Numerous modifications and adaptations will be readily apparent to those skilled in this art without departing from the spirit and scope of the present invention.

What is claimed is:

1. A front-end circuit for a multi-mode communication terminal device, comprising:
    at least one switch element selected from the group consisting of RF switches, duplexers and diplexers;
    a common antenna;
    a first transmission system being a pure mode transmission system configured to operate in a pure TDD mode;
    a second transmission system being a pure mode transmission system configured to operate in a pure FDD mode;
    filters provided for said first and second transmission systems;
    a connecting circuit via which individual filters of said filters are connected to said common antenna, said connecting circuit comprising said at least one switch element;
    said filters comprising a first filter, a second filter, and a third filter, said first filter being a transmit filter of said FDD system, said second filter being a common receive filter for said TDD system and said FDD system, and said third filter being a transmit filter for said TDD system;
    a duplexer formed by said first filter and said second filter; and
    a switch element comprising an RE switch to connect said common antenna with one of said duplexer and said third filter.

2. The circuit according to claim 1, further comprising:
    a diplexer;
    wherein a transmission band and a reception band of a transmission system form a band pair, a frequency difference between band pairs of a first and of a second transmission system amounts to approximately one octave, said diplexer being arranged between said common antenna and said filters for distinguishing between said band pairs.

3. The circuit according to claim 1, further comprising a low pass filter as a transmission filter.

4. The circuit according to claim 1, further comprising:
    an RF switch between a common transmission path for said pure FDD mode transmission system and said pure TDD mode transmission system and two transmission filters; and
    an RE multiple switch at said antenna for switching between a duplexer for said FDD mode, a transmission filter and a reception filter for said TDD mode;
    frequency bands of said mixed mode transmission system being clearly spaced from one another.

5. The circuit according to claim 1, wherein said switches are fashioned as GaAs FET transistors.

6. The circuit according to claim 1, wherein said switches are realized with PIN diodes having additional phase shifters.

7. The circuit according to claim 1, wherein individual components of the circuit are arranged in a discrete manner on a common printed circuit board.

8. The circuit according to claim 1, wherein at least a part of discrete components of said circuit is integrated in a common substrate.

9. The circuit according to claim 8, wherein all individual components together with a DC drive are integrated in a common substrate that is realized in a multi-layer technique with partially planar structures.

10. The circuit according to claim 1, further comprising a directional coupler for regulating power of a power amplifier as part of a detector of at least one transmission input.

11. The circuit according to claim 1, further comprising a protective element that protects a transmission amplifier against fedback or reflected power and is selected from a group consisting of an insulator and a circulator, and is arranged between a transmission amplifier and a transmission filter.

12. The circuit according to claim 1, further comprising an RF switch between a common transmission path for said pure FDD mode transmission system and said pure TDD mode transmission system and two transmission filters.

13. The circuit of claim 1, wherein frequency bands of said first and second transmission systems are overlapping or adjacent to each other.

14. The circuit according to claim 1, wherein said switch is a duplexer, wherein said duplexer is realized as an independent component and comprises at least one filter selected from the group consisting of a SAW filter, an MWK filter, an FBAR filter, a strip-line filter, and an LC-filter.

15. The circuit according to claim 1, further comprising:
    a common transmit path for said TDD system and said FDD system; and
    a further RF switch to connect said common transmit path with one of said second filter and said third filter.

* * * * *